(No Model.) 2 Sheets—Sheet 1.
L. ALDRICH.
STEAM PIPE COUPLING FOR RAILWAY CARS.
No. 401,920. Patented Apr. 23, 1889.
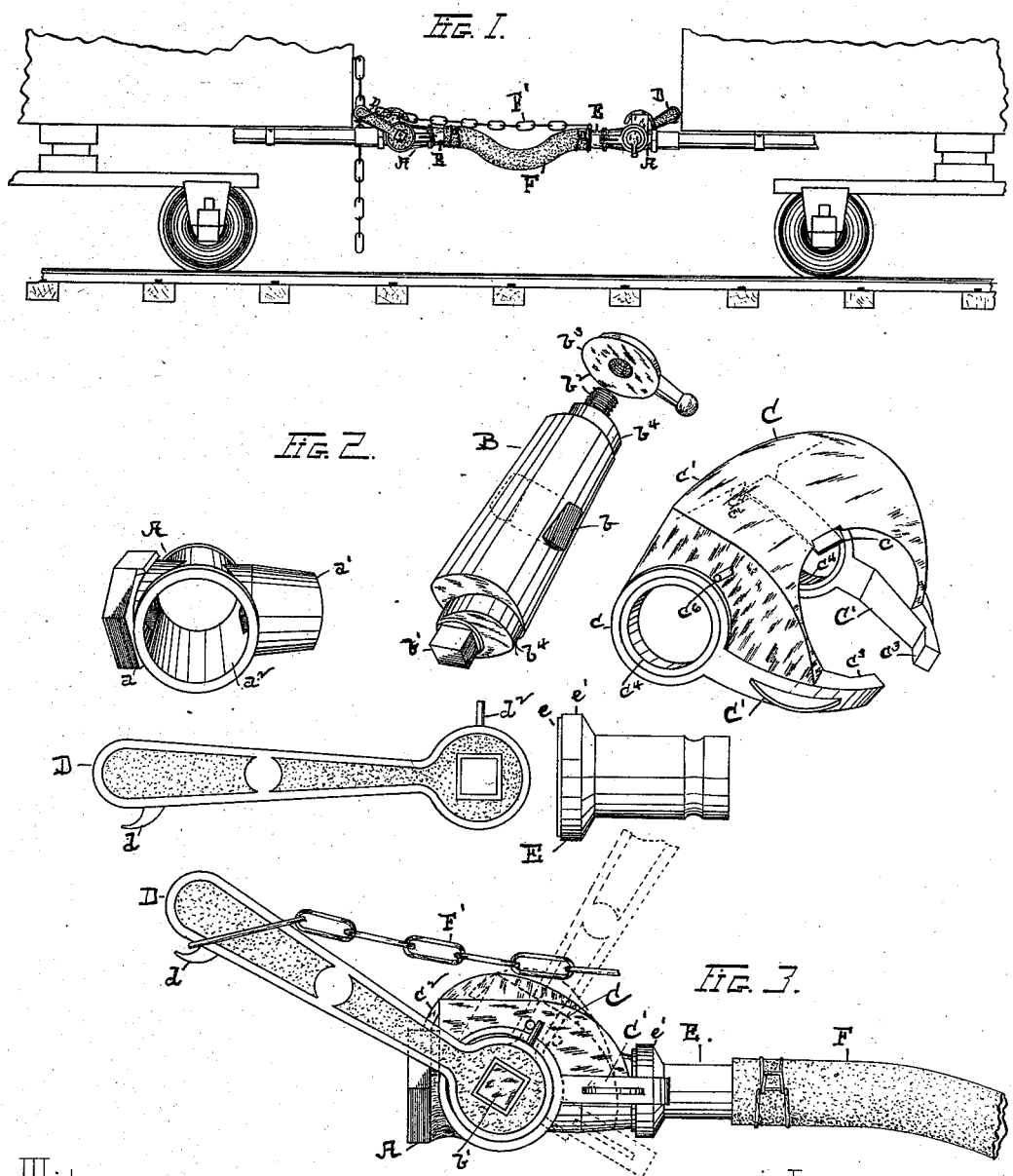
Witnesses
H. Gardner
J. E. Chapman
Inventor
L. Aldrich,
By Hawes & Chapman
Attorneys.

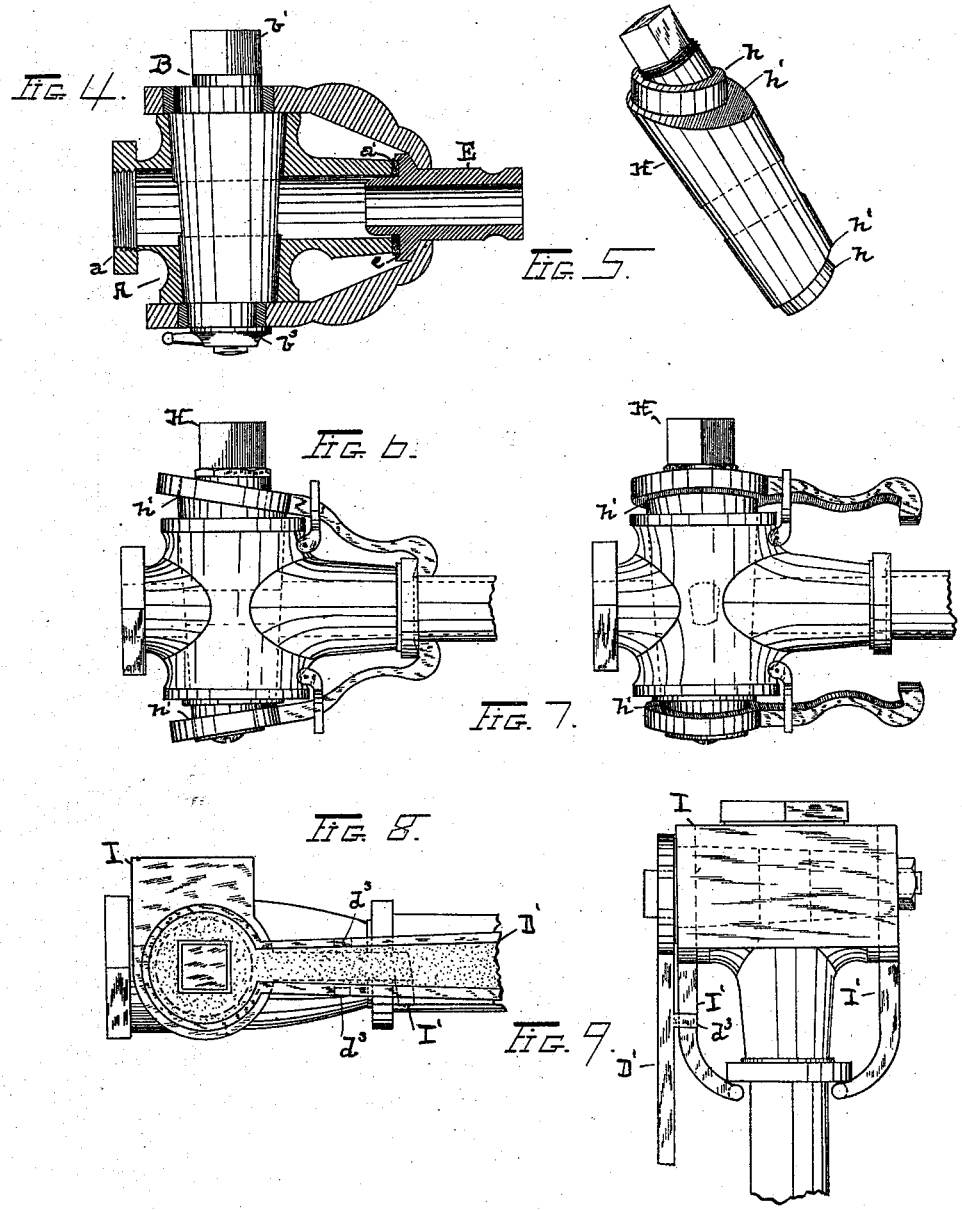
(No Model.) 2 Sheets—Sheet 2.
L. ALDRICH.
STEAM PIPE COUPLING FOR RAILWAY CARS.
No. 401,920. Patented Apr. 23, 1889.

UNITED STATES PATENT OFFICE.

LORIN ALDRICH, OF INDIAN ORCHARD, MASSACHUSETTS.

STEAM-PIPE COUPLING FOR RAILWAY-CARS.

SPECIFICATION forming part of Letters Patent No. 401,920, dated April 23, 1889.

Application filed February 7, 1888. Serial No. 263,317. (No model.)

*To all whom it may concern:*

Be it known that I, LORIN ALDRICH, of Indian Orchard, in the county of Hampden and Commonwealth of Massachusetts, have invented a new and useful Improvement in Steam-Pipe Couplings for Railway-Cars, of which the following is a specification, reference being had to the accompanying drawings, forming part thereof.

The object of my invention is to provide a coupling for uniting the ends of the pipe or pipes connected with railway-cars, for conveying steam-heat to their interiors, to the ends of the short pipe or hose extending between the cars, which will comprise within itself means for securely uniting the meeting ends of said pipes and for automatically disconnecting the same, and also means for opening and closing the passage through said coupling.

To this end my invention consists in a coupling composed of two members, one of which is provided with clamping-jaws adapted to be engaged with and disengaged from the opposite member, and with a valve for closing the passage through the coupling, said valve and jaws being so connected that movement of the former to close the passage will cause the latter to be disengaged from the opposite member of the coupling.

My invention consists, further, in a coupling composed of two members, one of said members comprising a plug-cock for closing the passage through the coupling, and clamping-jaws for engaging the second member, the plug of said cock being so connected with said jaws that rotation of the former about its axis will move the latter in such manner as to cause them to be engaged with and disengaged from the second member of the coupling.

My invention consists, further, in combining with a coupling of this nature means whereby the movement of the valve and clamping-jaws to close the former and cause the latter to release the second member will be effected automatically by the separation of the cars.

The invention also comprises certain details of construction hereinafter fully described, and particularly pointed out in the claims.

Referring to the drawings, in which like letters designate like parts in the several figures, Figure 1 illustrates the application of my improved coupling to the steam-heating pipes of railway-cars. Fig. 2, in three perspective and two side views, illustrates the individual parts composing the two members of the coupling. Fig. 3 is a side view of the coupling with its parts assembled. Fig. 4 is a horizontal sectional view thereof. Figs. 5, 6, and 7 illustrate a modified form of the coupling. Figs. 8 and 9 illustrate still another modification of the invention.

As hereinbefore stated, the coupling herein described is designed to be used in connection with the steam-heating pipes of railway-cars, and therefore one member thereof, which I will call the "first member," is adapted to be rigidly secured to the ends of the pipe on the car, while the second member is adapted to be secured to the ends of the short flexible pipe usually employed to connect the pipe of one car with that of the adjoining car, as represented in Fig. 1.

In the preferred form of the invention, as shown in Figs. 1 to 4, inclusive, the first member is composed of a shell, A, plug B, clamping-jaw frame C, and operating-lever D. (See Fig. 2.)

The shell A is tubular in form, having at one end an interiorly-threaded nut, $a$, by means of which the shell is adapted to be secured to the end of the steam-pipe extending beneath the floor of a car and having its opposite end formed into an annular seat, $a'$. Between its ends the shell A is provided with a tapering transverse chamber, $a^2$, to receive the plug B.

Plug B tapers from end to end in such manner as to closely fit chamber $a^2$ of the shell, and is provided with an orifice, $b$, extending transversely through it, as shown. At its large end the plug is provided with a squared portion, $b'$, to receive a wrench or operating-lever, and at its small end with a threaded portion, $b^2$, to receive nut $b^3$, by means of which the plug is retained in proper position within shell A. The shell and plug thus constructed form a plug-cock, by means of which the passage through the shell can be opened and closed at will by imparting a partial revolution about its axis to the plug.

The letter C designates the frame for supporting the jaws, and I prefer to make said frame and the jaws $C'$ $C'$ integral, as shown in Fig. 2. Said frame is composed of two journals, $c$ $c$, united by a bridge-piece, $c'$, which has a concave depression in its front side and a depending lug, $c^2$, at its rear side, for a purpose presently to be described. The jaws $C'$ project forwardly from the front side of the journals $c$, curving slightly toward each other and having the inner surface of their extreme outer ends formed into inclined bearing-faces $c^3$ $c^3$, as shown. The journals $c$ $c$ of the frame $C$ are designed to receive the opposite ends of plug B upon either side of shell A when the parts are assembled, and in order to secure a bodily progressive movement of the frame by a revolving movement of the hub I form upon the latter at each end an eccentric portion, $b^4$, and preferably provide the journals $c$ $c$ with bearing-ring $c^4$, fitted to the inner surface thereof. Such construction enables me to assemble the parts named by inserting the small end of plug B through one of the journals $c$ at one side of shell A, thence through chamber $a^2$, and through the journal at the opposite side of said shell, the rings $c^4$ being then placed upon the eccentrics $b^4$ within the journals and filling all the space between said parts. When thus mounted upon the plug, the frame C is capable of a rocking movement about the plug as a center, which movement is limited in a forward direction by contact of the concave surface in the front side of the bridge-piece $c'$ with the surface of shell A in front of chamber $a^2$, and in a rearward direction by contact of lug $c^2$ with the surface of the shell in the rear of chamber $a^2$. A leaf-spring, $c^5$, secured to the inner surface of frame C, and bearing against shell A, serves to normally retain the frame in its rearmost position, with jaws $C'$ substantially parallel with the bore of shell A.

The operating-lever D is in the form of a wrench having a square orifice to receive the squared end $b'$ of the plug, and it may be retained thereon by a key or in other convenient manner. The handle portion of said lever is preferably provided with a projecting lug, $d$, near its outer end, as shown, to support the end of a chain, as will be presently described.

From the foregoing description it will be obvious that by imparting a one-fourth revolution to plug B, by means of handle or lever D, the orifice $b$ will be moved from a position in alignment with the bore of shell A to a position at a right angle to said bore, and that when in the latter position said plug will entirely close the passage through the shell. It will be obvious, furthermore, that such movement of the plug will, through eccentrics $b^4$, impart a bodily movement to frame C and jaws $C'$, either toward the front or rear of shell A, as the plug is revolved in one or the other direction. In order that the lever D shall also cause a rocking movement of frame C, I provide the latter with a pin or lug, $c^6$, projecting laterally into the path of movement of said lever, and the relative arrangement of the orifice $b$, squared end $b'$, and eccentrics $b^4$ of plug B, and said pin or lug $c^6$ on the frame is such that when the lever D stands at substantially the angle shown by full lines in Fig. 3 orifice $b$ will be in alignment with the bore of shell A, and eccentrics $b^4$ will have their longest radius substantially parallel with the handle of said lever D, whereby the frame C will stand in its rearmost position. It follows from such arrangement of said parts that when lever D is moved to the position shown by broken lines in Fig. 3 it will revolve plug D to a position where it will close the passage through the shell, such movement of the plug also moving frame C and jaws $C'$ to their extreme forward position, and pin or lug $c^6$ is so located that just before the lever D completes such movement its handle will be brought into contact with said lug and will thereby rock the frame forwardly until its concave face rests upon shell A, with jaws $C'$ standing at substantially the angle shown by broken lines in said Fig. 3. In the reverse movement of the lever D the frame C is first rocked rearwardly until its lug $c^2$ rests upon shell A, being then moved rearwardly by the eccentrics $b^4$; and in order to stop the movement of said lever at the proper point to bring orifice $b$ of the plug into alignment with the bore of the shell I provide the handle with a lug, $d^2$, which, by its contact with lug $c^6$ on the shell, prevents further rearward movement of the lever. The second member of the coupling is composed of a tubular head, E, adapted to be secured to the ends of the short flexible tube or pipe F, by a clasp, as shown, or in any other convenient manner. At its front end the head E is provided with an annular bearing-face, $e$, to co-operate with the annular seat $a'$ on shell A, to make a light joint when brought into contact therewith, and I prefer to make said annular bearing-face of Babbitt metal or other composition, seated in an undercut groove in the face of head E, as shown in Fig. 4. In the rear of said bearing-face the head E is provided with a peripheral flange, $e'$, the rear face of which is inclined to correspond with the inclination of the surface $c^3$ on jaws $C'$. The ends of jaws $C'$ are therefore adapted to overlap said flange $e'$ when the two members of the coupling are brought together, as shown in Figs. 3 and 4, the first movement of frame C from the position shown by broken lines in Fig. 3 moving said jaws upwardly around said flange, and the continued bodily movement of said frame to the rear serving to tighten the grip of the jaws and to securely lock the two members of the coupling together. In the same manner the forward movement of the frame C loosens the grip of the jaws, and as the frame rocks forwardly the jaws are moved downwardly entirely clear of the flange $e'$, and the second member is then released from the first member, with the passage through the latter closed by the plug, as previously described. In order to automatically effect the release of said second member whenever two cars which have been previously coupled together are for any reason caused to separate, I provide a chain, F', one end of which can be secured to the end of the short pipe F, as shown, or to any part of the car itself, the free end of said chain being adapted to be slipped over the end of the handle of lever D, where it will be supported by lug $d$, as shown in Figs. 1 and 3. Said chain is of slightly less length than pipe F, so that upon a separation of the two cars strain will be exerted upon said chain before it is exerted upon the flexible pipe, whereupon said chain will draw lever D to its foremost position, thereby releasing the second member of the coupling, while the continued movement of the cars away from each other will free the end of the chain from said lever.

At this point I desire to call particular attention to the fact that inasmuch as the coupling herein described comprises within itself a valve it obviates the use of an independent valve in the pipe secured to the car for the purpose of preventing the escape of steam from the pipe at the rear end of the rear car of the train. I also wish to emphasize the fact that whereas such independent valves are always liable to be left open by inadvertence, and thus permit the steam to escape freely at the rear end of a train without performing its function of heating the cars, the valve forming part of my improved coupling is so connected to the clamping-jaws that whenever the latter are in position to lock the two members together the valve must be open, and the same movement which causes the jaws to release the second member necessarily closes the valve, thus rendering it impossible to inadvertently leave the valve open when the two members are detached from each other or to connect the two members without opening the valve. It will be obvious, furthermore, that the same result follows whether the two members be disconnected automatically or manually.

In Figs. 5, 6, and 7 I have shown a slightly-modified form of the invention, in which the plug H, in addition to the eccentric portions $h$, similar to those of plug B, is provided with cam-surfaces $h'$ at each end, and the jaws are mounted upon the plug independently of each other. The inclination of the cam-surfaces $h'$ is such that while the eccentrics $h$ are moving the jaws from their foremost to their rearmost position said cam-surfaces will move the front ends of the jaws from the position shown in Fig. 6 to that shown in Fig. 7, and vice versa. The jaws in this form of the invention, therefore, instead of rocking downwardly to release the second member of the coupling, spread laterally at their front ends for that purpose. The lever D will be utilized with this form of the coupling in the same manner as with that first described, suitable stops for limiting the movement of which can be secured to the adjacent jaw or its journal. I prefer to make the jaws in this form of the invention of substantially the conformation shown in Figs. 6 and 7, as they are thereby rendered slightly elastic, and therefore will be caused to tightly grip the peripheral flange on the second member, even though said flange should vary slightly from the proper width.

In Figs. 8 and 9 I have shown still another modified form of the invention, in which a jaw-supporting frame, I, similar to frame C, previously described, is employed; but said frame is mounted concentrically, instead of eccentrically, upon the plug, and has simply a rocking movement about the plug as an axis. The lever D' is mounted upon the plug in the same manner as previously described with reference to lever D, and its handle portion, which is of greater width than the jaws I', is provided with laterally-projecting lugs $d^3$, one above and the other below the adjacent jaw, with, preferably, a space of substantially one-eighth of an inch between said jaw and said lugs. The jaws I', at their front end, are provided with a downwardly-extending bearing-surface inclined at an obtuse angle to the body portion of said jaws, as shown by broken lines in Fig. 8. The movement of the lever D' to open and close the plug-cock rocks the frame I and moves the outer ends of the jaws in the arc of a circle about the plug as a center, and by moving said jaws downwardly when the two members of the coupling are placed together the inclined surfaces at the ends of the jaws are caused to act as wedges against the rear face of the peripheral flange on the second member, and thus clamp the two members closely together.

By means of the slight lost motion between the jaw and lugs on the lever previously mentioned provision is made for striking a slight blow against the lower side of the jaw, by a quick upward movement of the lever, to facilitate the release of the jaws from their engagement with the second member.

It will be observed that in each of the three forms of the invention shown and described the coupling comprises within itself a plug-cock and clamping-jaws, and connections between the same whereby the movement of the jaws to connect the two members of the coupling together must be accompanied by a movement of the plug to open the passage through the shell, and vice versa.

The coupling herein described is simple in construction and not likely to become impaired with use, as its several parts are both strong and durable.

It is obvious that modifications other than those described can be made without departing from the spirit of my invention.

Having thus fully described my invention, what I claim, and desire to secure by Letters Patent, is—

1. The pipe-coupling herein described, composed of two members, one of said members comprising a plug-cock for closing the passage through the coupling, the plug of said cock having at or near each end portions which are eccentric to its axial center, and two clamping-jaws for engaging the second member, said jaws at their rear ends being swiveled upon said eccentric portions of said plug, substantially as described, whereby rotation of said plug will impart a bodily movement to said jaws.

2. The pipe-coupling herein described, composed of two members, one of said members consisting of shell A, having transverse chamber $a^2$, plug B, having orifice $b$ therein seated in said chamber, jaws C', mounted upon said plug upon each side of shell A and operating-lever D, and the other of said members consisting of tubular head E, having peripheral flange $e'$ thereon, substantially as set forth.

3. The pipe-coupling herein described, composed of two members, one of said members consisting of shell A, having annular bearing-face $a'$ and chamber $a^2$, plug B, having orifice $b$ and eccentric portions $b^4$, frame C, having journals $c$ and jaws C', and the second member consisting of head E, having annular bearing-face $e$ and flange $e'$, substantially as and for the purpose set forth.

4. The pipe-coupling herein described, one member of which consists of the plug-cock A B, the plug of which is provided with the eccentric portions $b^4$, frame C, carrying jaws C' and having journals $c$ to receive said eccentric portions of the plug, a lever fitted at one end to said plug, and a stop projecting from said frame C into the path of movement of said lever, and the second member of which consists of head E, arranged and operating substantially as described.

5. In a pipe-coupling, a first member consisting of plug-cock A B, and jaws C', having both a rocking and reciprocating movement upon said cock, said jaws having at their outer ends the inclined surfaces $c^3$, and a second member consisting of head E, having flange $e'$ thereon, the rear face of which is inclined to correspond with the inclination of said surfaces $c^3$ of jaws C', arranged and operating substantially in the manner and for the purpose described.

6. In a pipe-coupling, a first member consisting of shell A, plug B, having eccentrics $b^4$ at each end thereof, frame C, carrying jaws C', said frame having journals $c$ to receive said eccentrics $b^4$, and having stops $c'$ $c^6$ and spring $c^5$, and lever D, having stop $d^2$ thereon, and a second member consisting of head E, having flange $e'$ thereon, substantially as described.

7. As a means of connecting the ends of the steam-heating pipes of two adjoining cars with the ends of a short flexible pipe extending between the cars, the coupling herein described, composed of a first member adapted to be secured to the ends of the pipes on the cars, and a second member adapted to be secured to the ends of the intermediate pipe, said first member consisting of shell A, plug B, having eccentrics $b^4$, frame C, mounted upon said eccentrics and carrying jaws C', said frame having stops $c^2$ $c^6$, and lever D, having lug $d$ and stop $d^2$ thereon, and said second member being composed of tubular head E, having flange $e'$, in combination with a chain or similar device connected at one end to one of the cars and detachably secured at its opposite end to the lever D on the adjoining car, said chain being of less length than the intermediate pipe, whereby said lever will be automatically operated by a movement of the cars away from each other, substantially in the manner and for the purpose set forth.

LORIN ALDRICH.

Witnesses:
W. H. CHAPMAN,
T. M. BROWN.